US011435317B2

(12) United States Patent
Goldfine et al.

(10) Patent No.: US 11,435,317 B2
(45) Date of Patent: Sep. 6, 2022

(54) COMPLEX PART INSPECTION WITH EDDY CURRENT SENSORS

(71) Applicant: JENTEK Sensors, Inc., Marlborough, MA (US)

(72) Inventors: Neil J Goldfine, Cocoa Beach, FL (US); Todd M Dunford, Amherst, MA (US)

(73) Assignee: JENTEK Sensors, Inc., Marlborough, MA (US)

( * ) Notice: Subject to any disclaimer, the term of this patent is extended or adjusted under 35 U.S.C. 154(b) by 0 days.

(21) Appl. No.: 17/046,047

(22) PCT Filed: Apr. 9, 2019

(86) PCT No.: PCT/US2019/026673
§ 371 (c)(1),
(2) Date: Oct. 8, 2020

(87) PCT Pub. No.: WO2019/199894
PCT Pub. Date: Oct. 17, 2019

(65) Prior Publication Data
US 2021/0055262 A1    Feb. 25, 2021

Related U.S. Application Data

(60) Provisional application No. 62/654,691, filed on Apr. 9, 2018.

(51) Int. Cl.
*G01N 27/9013*    (2021.01)
*G01N 27/90*    (2021.01)

(52) U.S. Cl.
CPC ....... *G01N 27/902* (2013.01); *G01N 27/9006* (2013.01)

(58) Field of Classification Search
CPC .................. G01N 27/902; G01N 27/9006
(Continued)

(56) References Cited

U.S. PATENT DOCUMENTS

| 4,547,962 A * | 10/1985 | deWalle | G01N 27/9006 324/240 |
| 5,278,498 A * | 1/1994 | Vernon | G01N 27/902 324/234 |

(Continued)

OTHER PUBLICATIONS

International Search Report dated Aug. 1, 2019.
Written Opinion of the International Search Authority dated Aug. 1, 2019.

*Primary Examiner* — Judy Nguyen
*Assistant Examiner* — Rahul Maini
(74) *Attorney, Agent, or Firm* — Zachary M. Thomas (57) ABSTRACT

Eddy current sensing is governed by the diffusion equation of magnetoquasistatic fields. As such the eddy current sensor's proximity to the object to be inspected (i.e., "liftoff") significantly affects the sensor's response signal. Methods and apparatus are disclosed for improving performance for an eddy current sensor, though they may also be used for other sensor types. These solutions are beneficial for both single channel eddy current sensors and arrays, and are particularly beneficial for measuring parts with complex surfaces. In some aspects improved performance is achieved by varying the stiffness of the mechanical support for the sensor. Some mechanical supports may exhibit anisotropic stiffness. After performing a scan with an eddy current array, a multi-channel shape filtering module is applied to improve defect detection. The module reduces the variability of defect response measured due to the unpredictability of the defect location transverse to the scan direction.

19 Claims, 6 Drawing Sheets

(58) Field of Classification Search
USPC .......................................................... 324/219
See application file for complete search history.

(56) References Cited

U.S. PATENT DOCUMENTS

| | | | | |
|---|---|---|---|---|
| 2003/0025496 | A1* | 2/2003 | Trantow | G01N 27/9006 324/238 |
| 2009/0115410 | A1* | 5/2009 | McKnight | G01N 27/904 324/240 |
| 2016/0349214 | A1 | 12/2016 | Goldfine et al. | |

\* cited by examiner

FIG. 8D

COMPLEX PART INSPECTION WITH EDDY CURRENT SENSORS

RELATED APPLICATION

The present application claims the benefit of International Application No. PCT/2019/026673 with an international filing date of Apr. 9, 2019, which itself claims priority under 35 U.S.C. § 119(e) to U.S. provisional patent application, U.S. Ser. No. 62/654,691, filed Apr. 9, 2018, which are herein incorporated by reference in their entirety.

GOVERNMENT SUPPORT

This invention was made with government support under N68335-14-C-0075 awarded by the US Navy, and under FA8501-18-C-0007 awarded by the US Air Force. The government has certain rights in the invention.

TECHNICAL FIELD

The present disclosure relates to the field of measurement apparatus and methods. Some aspects of the disclosure relate to eddy current sensing and eddy current arrays.

BACKGROUND ART

Eddy current is a electromagnetic phenomenon that has been utilized to inspect materials for cracks, corrosion, porosity, and may other defect types. Eddy current sensing is governed by the diffusion equation of magnetoquasistatic fields. As such, the eddy current sensor's proximity to the object to be inspected (i.e., "liftoff") significantly affects the sensor's response signal. The defect detection capability thus becomes unacceptable at larger liftoffs. Practical applications exists where liftoffs above just several thousandths of an inch result in unacceptable defect detection performance.

Eddy current sensors can be built with one or more measurement channels. Eddy current arrays have a number of sense elements. The defect signal produced by eddy current arrays varies with the transverse position of the sense elements of the array relative to the defect. If a sense element passes directly over the defect the element generally produces a larger response than if the element is not centered on the defect. Generally the smallest element responses are observed when the array passes over the defect with the defect falling directly between two sense elements.

SUMMARY

Methods and apparatus are disclosed for improving performance for an eddy current sensor. The sensor may be mounted to a mechanical support that provides variable stiffness along the surface. By varying the stiffness the sensor may better conform to the surface of a complex part to be inspected. Improving the conformance of the sensor to the curvature of the part reduces the liftoff of the sensor. Under most conditions reduced liftoff improves the defect detection performance of the sensor. The stiffness of the mechanical support can be varied by including captured volumes within the mechanical support. These volumes may simply be void (typically air filled) or filled with another material of a different stiffness. By varying the size, location, fill material, and spacing of these captured volumes the stiffness observed at the sensor mounting surface can be varied in ways that improve conformance to a complex part.

The mounted sensor may be scanned along a complex part while measurement data is collected. The variable stiffness at the sensor surface may allow the sensor to maintain conformity with the complex part even if the curvature of the part varies along the scan path.

The sensor measurements can be processed to enhance observability of defects. Multivariate inverse methods based on physics based models may be used to isolate material response from the sensor response due solely to liftoff. The material response can be enhanced by accounting for the transverse position of the sense elements relative to any defects in the inspected part. Generally the transverse location of the defect is not known a priori. A signature library is used to process the measurement data from multiple adjacent sense elements (or equivalently adjacent passes of the sensor. The signature library contains a set of multi-channel defect signatures. Each defect signature can be made from the measured response of selected measurement channels when the sensor passes over the defect at different relative transverse locations. The measurement data is correlated with each of the signatures. Assuming a defect is present, the correlation will generally be largest with the signature having the closest transverse defect position as the measurement data. Advantageously a given defect will have approximately the same maximum correlation value regardless of the transverse position of the defect in a given scan.

Some aspects relate to a sensor cartridge comprising a sensor and a mechanical support. The mechanical support has a surface to which the sensor is secured. A first component of the mechanical support may be made with a first material and may have a plurality of captured volumes. The captured volumes are devoid of the first material. The surface to which the sensor is secured may thus have variable stiffness which improves conformity of the sensor cartridge to a feature of a test object when the sensor cartridge is pressed against the feature. The capture volumes may be holes, pits, internal pores, and the like. The captured volumes may be empty or filled with a material having a different stiffness than the first material.

In the case of holes, the holes may each have the same or different cross-sections. For example the holes may include a first hole having a first cross-section and a second hole having a second cross-section, the first cross-section being different from the second cross-section in terms of size, shape, or both. As another example, the holes may all have circular cross-sections of the same size. The maximum cross-sectional dimension of the holes may be any suitable size, in some applications between 1 and 5 mm, though other applications the dimension may be even larger or smaller. In some embodiments all the holes are axial and aligned in the same direction.

In some embodiments of the sensor cartridge, the sensor is an eddy current sensor array. An array may comprise a series of sense elements along one axis or direction. In some embodiments the array is perpendicular (or substantially perpendicular) to the axis of holes in the mechanical support. Thus if the sensor cartridge is scanned in a direction parallel to the axis of the holes the sensor array provides the greatest lateral coverage. In another embodiment, the sensor is at a 45 degree angle to the axis of the holes. Other angles can also be used such as between 35 and 55 degrees. This orientation, particularly when combined with a second sensor array at 90 degrees relative to the first (and negative 45 degrees relative to the hole axis), can provide improved crack detection when crack orientation is unknown or varies more than, say, plus/minus 20 degrees.

In some embodiments the sensor cartridge includes a second component made of a second material. The second material may have a greater stiffness than the first material. The second component may abut a second surface of the first component, the second surface having a normal that is substantially parallel to the axis of the holes.

In some embodiments the sensor mounting surface has a first flat region joined to a second flat region by a curved region. For example, similar to the shape of a fillet. The angle between the first flat region and second flat region may be between 20 and 170 degrees. The stiffness along the sensor mounting surface may be greater in the curved region than in both the first flat region and the second flat region.

In some embodiments the mechanical support includes a second component made of a second material stiffer than the first material, the second component can have a wedge-shape that points towards the curved region of the first surface. This wedge, in combination with the stiffness of the second material can increase the stiffness in the surved region as compared to the flat regions.

Another aspect relates to a system for defect detection. The system comprises a sensor array, an encoder, a memory unit, an instrument, and a correlation module. The sensor array has a plurality of sense elements. The encoder is configured to record a spatial position of the sensor array. The memory unit stores a signature library. The signature library has a plurality of defect signatures. Each defect signature in the signature library has, on a first number of channels, a defect response as a function of spatial position. The first number is two or more. The instrument is configured to collect measurements from each of the plurality of sense elements of the sensor array as a function of the spatial position obtained from the encoder. The correlation module correlates, as a function of spatial position, the measurements from a subset of sense elements with each defect signature in the signature library. The subset of sense elements has the same number of sense elements as the defect signatures have channels.

In some embodiments, the subset of sense elements are adjacent sense elements among the plurality of sense elements in the sensor array.

In some embodiments, the plurality of sense elements consists of a second number of sense elements, and the correlation module performs the correlation for a third number of subsets of sense elements, wherein the third number is equal to the second number minus the first number plus one. The correlation module may be further configured to determine a maximum correlation value from among the first number of correlations determined for each spatial position for each subset and store the maximum correlation value in the memory unit, and the system further comprises a display configured to output a visual representation of the maximum correlation values. For example, the display may represent the correlations in the form of a B-scan or C-scan image.

In some embodiments, the correlation module is further configured to determine a maximum correlation value from among the first number of correlations determined for each encoder position and store the maximum correlation value in the memory unit.

In some embodiments, each of the plurality of defect signatures has the same spatial length and each channel of each signature has zero mean. The system may further include a measurement preprocessing module that is configured to resample the measurements to have a measurement spacing equal to that of the defect signatures; to define measurement sets from the measurements to be correlated by the correlation module with each measurement set having the spatial length; and (iii) to remove from each measurement set its mean so that each measurement set has zero mean.

In some embodiments the system includes a multivariate inverse method module that applies a model based inverse method to the measurements to estimate a material property to be correlated with the signatures of the signature library.

In some embodiments, the sensor array is an eddy current sensor array having a common drive winding shared by the plurality of sensing elements.

In some embodiments, the sensor array is a capacitive sensor array having one or more drive electrodes and where each sense element is a sense electrode.

In some embodiments, the plurality of sense elements consists of a second number of sense elements, and the instrument collects measurements from the second number of sense elements using a second number of parallel measurement channels. The parallel measurement channels of the instrument may simultaneously measure a real part and an imaginary part of the respective measurement.

In some embodiments, the signature library stored in the memory unit comprises defect signatures obtained at a plurality of liftoffs.

In some embodiments, the signature library is a first signature library for a first frequency, the memory unit stores a second signature library having defect signatures obtained at a second frequency, the instrument collects measurements at the first and second frequencies, and the correlation module correlates measurements at the first frequency with the defect signatures of the first signature library and correlates measurements at the second frequency with the defect signatures of the second signature library.

Another aspect relates to a method of inspecting a test object. The method includes an act of pressing a sensor cartridge into a concave surface of the test object, the sensor cartridge comprising a sensor with a plurality of sensing elements and a mechanical support, wherein the pressing elastically deforms the mechanical support from a relaxed state, wherein a radius of curvature of the mechanical support is smaller than a radius of curvature of the concave surface, to a compressed state, wherein the mechanical support conforms to the concave surface. The method also includes an act of collecting measurement data from the sensor cartridge.

In some embodiments, the method further comprises an act of scanning the sensor cartridge axially along the concave surface of the test object. During the scanning the collecting of measurement data repeats a plurality of times.

In some embodiments, the mechanical support comprises a plurality of holes axially aligned with an axis of the radius of curvature of the mechanical support.

In some embodiments, the concave surface of the test object is a fillet formed at the joint of a first surface and a second surface having an angle that varies axially along the fillet, and during the scanning the mechanical support maintains conformity with the concave surface of the test object.

In some embodiments, the test object is an engine component. The concave surface of the engine component may be a root radius of a blade. The concave surface may be a fillet of a fir tree region of the engine component.

In some embodiments, the test object is a welded part with a weld crown, and the concave surface is a first concave surface along one side of the weld crown that joins into a first base material. The weld crown may include a second concave surface along another side of the weld crown that joins into a second base material, and the pressing comprises pressing the sensor cartridge into both the first and second concave surfaces. The scanning may include scanning at least two sense elements along the first base material and at least two sense elements long the second base material.

The foregoing is a non-limiting summary of the invention, which is defined by the attached claims.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Figure 1:
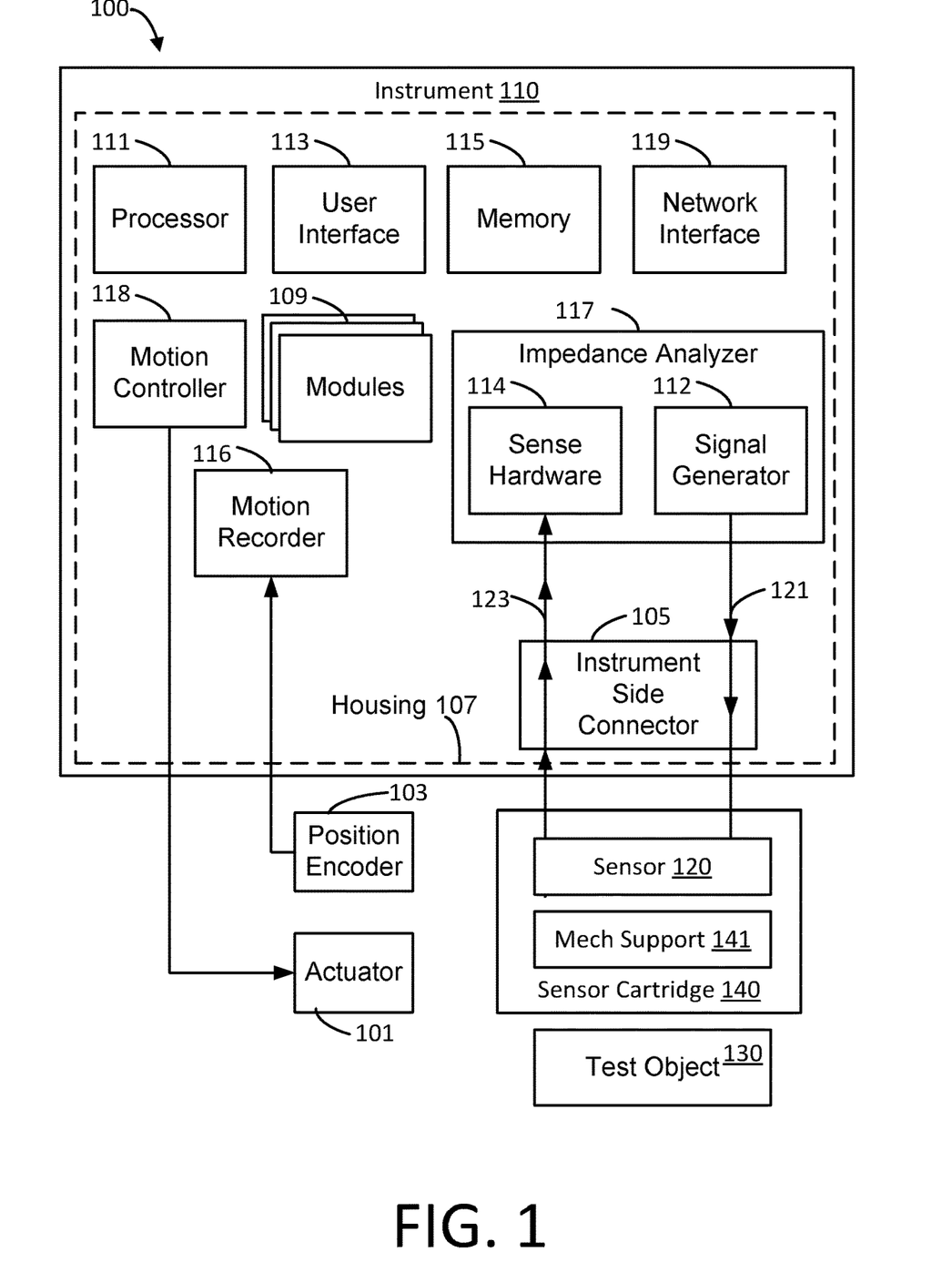
FIG. 1 is a block diagram of a measurement system according to some embodiments.

FIG. 1 is a block diagram of a system 100 for inspecting a test object 130. System 100 includes an instrument 110 and a sensor cartridge 140. Instrument 110 may be housed in a housing 107; in some embodiments the housing is substantially cylindrical in shape. Sensor cartridge 140 may have a rigid connector which interfaces both mechanically and electrically with an instrument side connector 105. Advantageously in some embodiments both the electrical and mechanical connections of sensor cartridge 140 engage simultaneously with connector 105. In some other embodiments, sensor cartridge is functionally connected to instrument side connector 105 through a cable. Sensor cartridge 140 in some embodiments also includes a flexible sensor 120, and a mechanical support 141 to which the sensor is attached. Sensor 120 may be attached to mechanical support 141 with glue, tape, double sided tape, or in any suitable way. Instrument 110 is configured to provide excitation signals 121 to sensor 120 and measure the resulting response signals 123 of sensor 120. Response signals 123 may be measured and processed to estimate properties of interest, such as electromagnetic properties (e.g., electrical conductivity, permeability, and permittivity), geometric properties (e.g., layer thickness, sensor liftoff), material condition (e.g., fault/no fault, crack size, layer to layer bond integrity, residual stress level, temperature), or any other suitable property or combination thereof including properties of the fabricated part and the powder. (Sensor liftoff is a distance between the sensor and the closest surface of the test object for which the sensor is sensitive to the test object's electrical properties.)

Instrument 110 may include a processor 111, a user interface 113, memory 115, an impedance analyzer 117, and a network interface 119. Though, in some embodiments of instrument 110 may include other combinations of components. While instrument 110 is drawn with housing 107, it should be appreciated that instrument 110 may be physically realized as a single mechanical enclosure; multiple, operably-connected mechanical enclosures, or in any other suitable way. For example, in some embodiments it may be desired to provide certain components of instrument 110 as proximal to sensor 120 as practical, while other components of instrument 110 may be located at greater distance from sensor 120.

Processor 111 may be configured to control instrument 110 and may be operatively connected to memory 115. Processor 111 may be any suitable processing device such as for example and not limitation, a central processing unit (CPU), digital signal processor (DSP), controller, addressable controller, general or special purpose microprocessor, microcontroller, addressable microprocessor, programmable processor, programmable controller, dedicated processor, dedicated controller, or any suitable processing device. In some embodiments, processor 111 comprises one or more processors, for example, processor 111 may have multiple cores and/or be comprised of multiple microchips. Processing of sensor data and other computations such as for control may be performed sequentially, in parallel, or by some other method or combination of methods.

Memory 115 may be integrated into processor 111 and/or may include "off-chip" memory that may be accessible to processor 111, for example, via a memory bus (not shown). Memory 115 may store software modules that when executed by processor 111 perform desired functions. Memory 115 may be any suitable type of non-transient computer-readable storage medium such as, for example and not limitation, RAM, a nanotechnology-based memory, optical disks, volatile and non-volatile memory devices, magnetic tapes, flash memories, hard disk drive, circuit configurations in Field Programmable Gate Arrays (FPGA), or other semiconductor devices, or other tangible, non-transient computer storage medium.

Instrument 110 may have one or more functional modules 109. Modules 109 may operate to perform specific functions such as processing and analyzing data. Modules 109 may be implemented in hardware, software, or any suitable combination thereof. Memory 115 of instrument 110 may store computer-executable software modules that contain computer-executable instructions. For example, one or more of modules 109 may be stored as computer-executable code in memory 115. These modules may be read for execution by processor 111. Though, this is just an illustrative embodiment and other storage locations and execution means are possible.

Instrument 110 provides excitation signals for sensor 120 and measures the response signal from sensor 120 using impedance analyzer 117. Impedance analyzer 117 may contain a signal generator 112 for providing the excitation signal to sensor 120. Signal generator 112 may provide a suitable voltage and/or current waveform for driving sensor 120. For example, signal generator 112 may provide a sinusoidal signal at one or more selected frequencies, a pulse, a ramp, or any other suitable waveform. Signal generator may provide digital or analog signals and include conversion from one such mode to another.

Sense hardware 114 may comprise multiple sensing channels for processing multiple sensing element responses in parallel. As there is generally a one to one correspondence between sense elements and instrumentation channels these terms may be used interchangeably. It should be appreciated that care should be used, for example, when multiplexing is used to allow a single channel to measure multiple sense elements. For sensors with a single drive and multiple sensing elements such as the MWM-Array the sensing element response may be measured simultaneously at one or multiple frequencies including simultaneous measurement of real and imaginary parts of the transimpedance. Though, other configurations may be used. For example, sense hardware 114 may comprise multiplexing hardware to facilitate serial processing of the response of multiple sensing elements and for eddy current arrays other than MWM-Arrays multiplexing may be used for combinations of sensing elements and drive elements. Some embodiments use MWM-Array formats to take advantage of the linear drive and the ability to maintain a consistent eddy current pattern across the part using such a linear drive. Sense hardware 114 may measure sensor transimpedance for one or more excitation signals at on one or more sense elements of sensor 120. It should be appreciated that while transimpedance (sometimes referred to simply as impedance), may be referred to as the sensor response, the way the sensor response is represented is not critical and any suitable representation may be used. In some embodiments, the output of sense hardware 114 is stored along with temporal information (e.g., a time stamp) to allow for later temporal correlation of the data, and positional data correlation to associate the sensor response with a particular location on test object 130.

Sensor 120 may be an eddy-current sensor, a dielectrometry sensor, an ultrasonic sensor, thermography method, or utilize any other suitable sensing technology or combination of sensing technologies. In some embodiments sensor 120 provides temperature measurement, voltage amplitude measurement, stain sensing or other suitable sensing modalities or combination of sensing modalities. In some embodiments, sensor 120 is an eddy-current sensor such as an MWM®, MWM-Rosette, or MWM-Array sensor available from JENTEK Sensors, Inc., Marlborough, Mass. Sensor 120 may be a magnetic field sensor or sensor array such as a magnetoresistive sensor (e.g., MR-MWM-Array sensor available from JENTEK Sensors, Inc.), a segmented field MWM sensor, and the like. In another embodiment, sensor 120 is an interdigitated dielectrometry sensor or a segmented field dielectrometry sensor such as the IDED® sensors also available from JENTEK Sensors, Inc. Segmented field sensors have sensing elements at different distances from the drive winding or drive electrode to enable interrogation of a material to different depths at the same drive input frequency. Sensor 120 may have a single or multiple sensing and drive elements. Sensor 120 may be scanned across, mounted on, or embedded into test object 130.

In some embodiments, the computer-executable software modules may include a sensor data processing module, that when executed, estimates properties of test object 130. The sensor data processing module may utilize multi-dimensional precomputed databases that relate one or more frequency transimpedance measurements to properties of test object 130 to be estimated. The sensor data processing module may take the precomputed database and sensor data and, using a multivariate inverse method, estimate material properties for the processed part or the powder. Though, the material properties may be estimated using any other analytical model, empirical model, database, look-up table, or other suitable technique or combination of techniques.

User interface 113 may include devices for interacting with a user. These devices may include, by way of example and not limitation, keypad, pointing device, camera, display, touch screen, audio input and audio output.

Network interface 119 may be any suitable combination of hardware and software configured to communicate over a network. For example, network interface 119 may be implemented as a network interface driver and a network interface card (NIC). The network interface driver may be configured to receive instructions from other components of instrument 110 to perform operations with the NIC. The NIC provides a wired and/or wireless connection to the network. The NIC is configured to generate and receive signals for communication over network. In some embodiments, instrument 110 is distributed among a plurality of networked computing devices. Each computing device may have a network interface for communicating with other the other computing devices forming instrument 110.

In some embodiments, multiple instruments 110 are used together as part of system 100. Such systems may communicate via their respective network interfaces. In some embodiments, some components are shared among the instruments. For example, a single computer may be used control all instruments. In one embodiment multiple areas on the test object are scanned using multiple sensors simultaneously or in an otherwise coordinated fashion to use multiple instruments and multiple sensor arrays with multiple integrated connectors to inspect the test object surface faster or more conveniently.

Actuator 101 may be used to position sensor cartridge 140 with respect to test object 130 and ensure that the liftoff of the sensor 120 is in a desired range relative to the test object 130. Actuator 101 may be an electric motor, pneumatic cylinder, hydraulic cylinder, or any other suitable type or combination of types of actuators for facilitating movement of sensor cartridge 140 with respect to test object 130. Actuators 101 may be controlled by motion controller 118. Motion controller 118 may control sensor cartridge 140 to move sensor 120 relative to test object 130.

Regardless of whether motion is controlled by motion controller 118 or directly by the operator, position encoder 103 and motion recorder 116 may be used to record the relative positions of sensor 120 and test object 130. This position information may be recorded with impedance measurements obtained by impedance instrument 117 so that the impedance data may be spatially registered.

For some applications the performance of system 100 depends (among other things) on the proximity of sensor 120 to test object 130; that is to say the sensor liftoff may be critical to performance for such applications. For example, crack detection in an aerospace application may require cracks 0.5 mm (0.02 inches) in length be reliably detectable in test object 130 (e.g., a turbine disk slot). In order to achieve reliable detection of a small crack, sensor 120's liftoff may need to be kept to under 0.25 mm (0.010 inches). Further, for such an application, sensor 120 may preferably be a sensor array, thus the liftoff of each element in the array may need to be kept to under 0.25 mm (0.010 inches). (It should be appreciated that these dimensions are illustrative and the specific requirements will be dictated by the details of the application.) Measurements may be complicated when test object 130 has a complex curved surface that may change along a measurement scan path.

The inventors have recognized and appreciated that the design of sensor cartridge 140 including mechanical support 141 can play an important role in achieving acceptable liftoff with sensor 120. A sensor cartridge that reliably maintains a low liftoff while accounting for misalignment, variable part geometry, and part tolerances is disclosed. Such sensor cartridges may be used in scanning, point measurement, monitoring, and other applications. In some embodiments mechanical support 141 has spatially varying stiffness when measured at the sensor mounting surface. Varying stiffness may be achieved by varying the density (including complete removal of the material in some areas) of mechanical support 141. In some embodiments the density of the mechanical support is achieved by having captured volumes that are devoid of the material used to make the mechanical support (or at least used to make one of the components of the mechanical support). A captured volume is a pit, an enclosed space, or a hole. These captured volumes may be voids (e.g., air filled) or filled with a second material which has a different stiffness that the primary material.

Figure 2A:
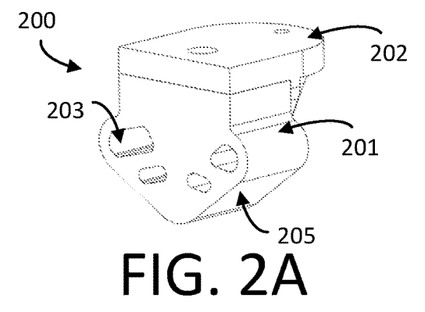
FIGS. 2A-2H are sensor cartridges, mechanical supports, and the like, according to some embodiments.
Figure 2B:
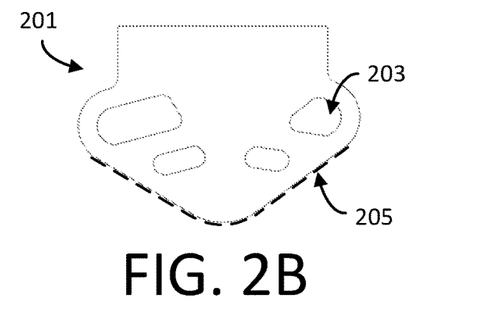

FIG. 2A shows a perspective view of embodiment 200 of mechanical support 141. Such a mechanical support may be part of a sensor cartridge for scanning a fillet. Mechanical support 200 may include components 201 and 202 made of different materials. FIG. 2B shows a front view of component 201. Component 201 may be made of a relatively compliant material such as one at or below Shore OO 70, Shore OO 60, Shore OO 50 Shore OO 40, Shore OO 30, Shore OO 20, Shore OO 10, or another suitable stiffness. By contrast, component 202 may be made of a relatively stiff material such as at or above Shore OO 80, Shore OO 90, Shore OO 95, or another suitable stiffness. Plastics and rubbers and other suitable materials may be used to fabricate components 201 and 202. Sensor 120 may be mounted on surface 205 which is indicated by a dashed line. Glue, tape, double sided tape, or any suitable tool may be used to secure sensor 120 to surface 205. In some embodiments sensor 120 is a 7-channel array with a central channel centered at the bottom of component 201 and 3 channels going up both the left and right sides of surface 205.

Figure 2C:
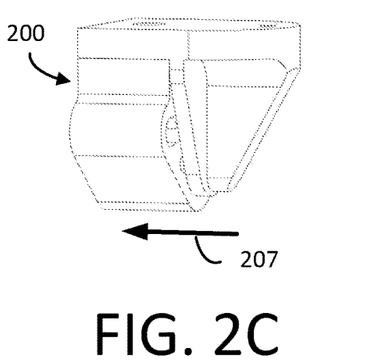
Figure 2D:
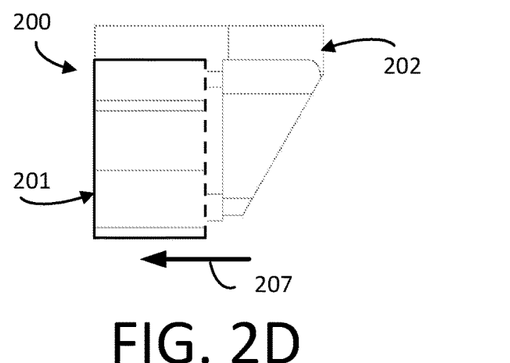

Component 201 includes several holes 203 to create a variable stiffness for mechanical support 200 as measured along surface 205. The holes also create anisotropic stiffness in the material. Specifically a force in the scan direction (out of the page in FIG. 2B) will result in less displacement from the mechanical support 200 than a force perpendicular to surface 205. To further increase the stiffness of the mechanical support 200, component 202 can support the trailing edge (relative to scan direction 207) of component 201 as shown in FIGS. 2C and 2D. For clarity component 201 is outlined in bold in FIG. 2D with its trailing edge surface abutting component 202 indicated by a dashed line.

Holes 203 in component 201 are notably asymmetric. In this example embodiment the asymmetry is created to provide more stiffness on the right side as compared to the left side (side references to FIG. 2B). The design choice in this embodiment was based on a hand held scanning process whereby the shape of test object 130 was variable. Since one side of the test object 130 was used to orient mechanical support 200, one side of component 201 required a greater reduction in stiffness than the other.

Figure 2E:
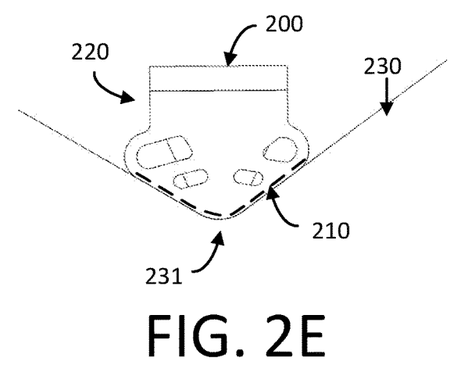
Figure 2F:
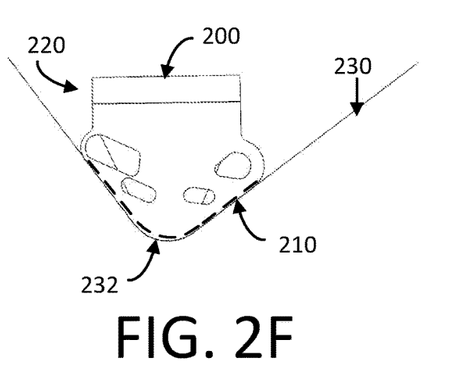

FIGS. 2E and 2F show a sensor cartridge 220 made from mechanical support 200 and a sensor 120 in fillet 231 and 232, respectively, of a test object 230. For simplicity sensor 120, which may be only a few thousandths of an inch thick, is not shown in these figures; sensor 120 is along the sensor mounting surface indicated as a dashed line 210. FIGS. 2E and 2F show that sensor cartridge 220 maintains conformity with both fillets 231 and 232 despite the change in angle of the walls. Specifically, walls of test object 230 adjacent fillet 231 form a larger angle compared to the walls of test object 230 for fillet 232. Note that fillets 231 and 232 may be along a single scan path with varying wall angle for sensor cartridge 220. The relatively low stiffness of the left side of mechanical support 200 allows conformance over such a range of angles during a scan while the right side is used for orientation. Note that the choice in this embodiment to use the right side of the fillet for orientation is based on other constraints of the application.

It should be appreciated that while holes were used to create variable stiffness in mechanical support 200, variable stiffness for mechanical support 141 may be achieved in other suitable ways. For example, material voids within mechanical support 141 may, in addition to holes, also take the form of internal pores, pits and the like. In some embodiments the void is filled with a material of a different intrinsic stiffness than the primary material. In some embodiments the stiffness of mechanical support 141 is anisotropic. In some embodiments removable plugs of the same or different stiffnesses as the primary material of mechanical support 141 may be used to fill one or more the voids to fine tune performance during application development or even as part of adapting for varying conditions in a deployed application.

Figure 2G:
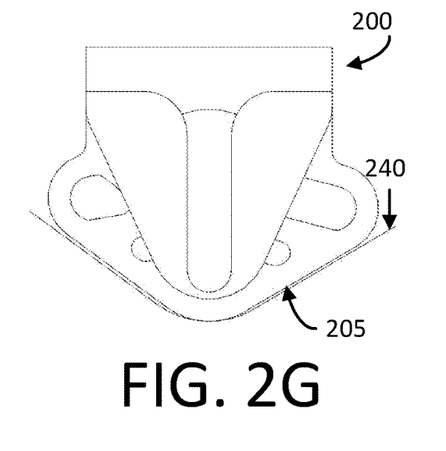
Figure 2H:
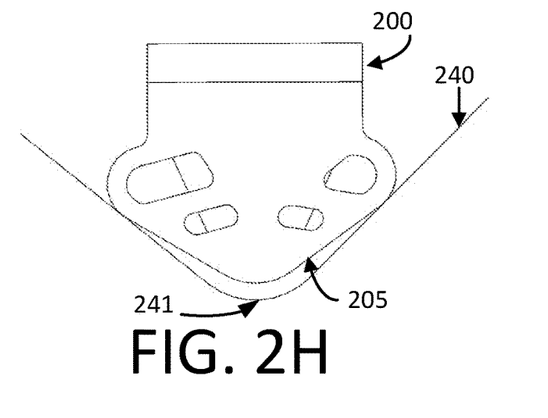

FIGS. 2G and 2H show an embodiment where the tip of mechanical support 200 (i.e., the curvature of the sensor mounting surface 205) has a smaller radius than a test object 240. When pressed into the part, as shown in FIG. 2G, the tip will expand to match the radius of test object 240. In some embodiments the sides of mechanical support 200 will not match the shape of the part to be inspected in order to modify the pressure along the inspection surface. FIG. 2H shows the sides of mechanical support 200 touching the walls of test object 240 first as it is pressed into fillet 241 in order to provide increased pressure on areas of surface 205 that are further away from fillet 241. (Note that FIG. 2G shows a back view of mechanical support 200 while FIG. 2H shows a front view.)

Figure 3A:
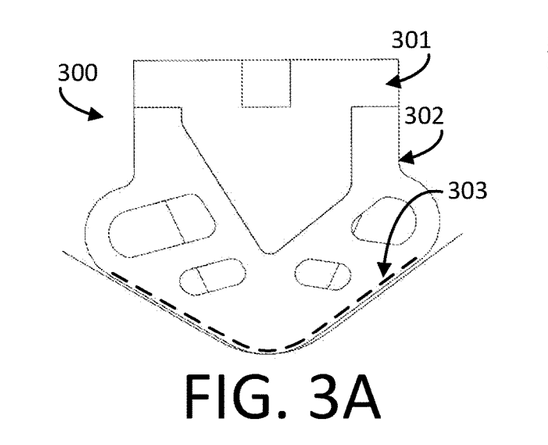
FIGS. 3A-3B are mechanical supports according to some embodiments.

FIG. 3A show an embodiment 300 of mechanical support 141 with two materials, hard material 301 and soft material 302. Hard material 301 is relatively stiff (e.g., at or above Shore OO 90) as compared to soft material 302 (e.g., at or below Shore OO 70). In embodiment 300, in order to increase pressure along sensor mounting surface 303 (indicated by a dashed line), hard material 301 has a wedge shape that points towards surface 303 in the fillet region.

Figure 3B:
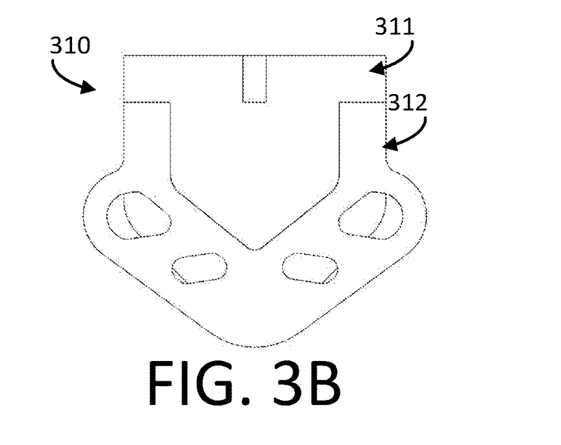

FIG. 3B shows another embodiment 310 of mechanical support 121 with a hard and soft materials (311 and 312, respectively). This embodiment is similar to embodiment 300, however, the design is symmetric.

Figure 4A:
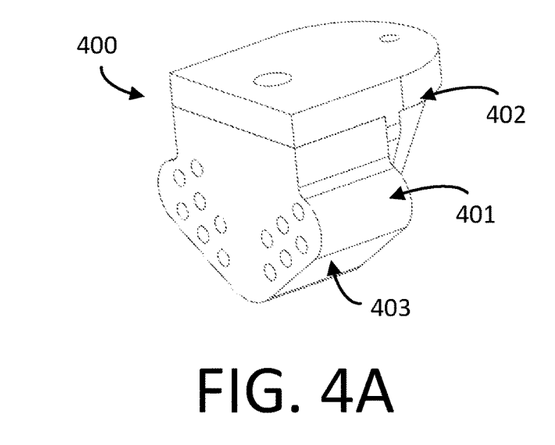
FIGS. 4A-4B are mechanical supports according to some embodiments.
Figure 4B:
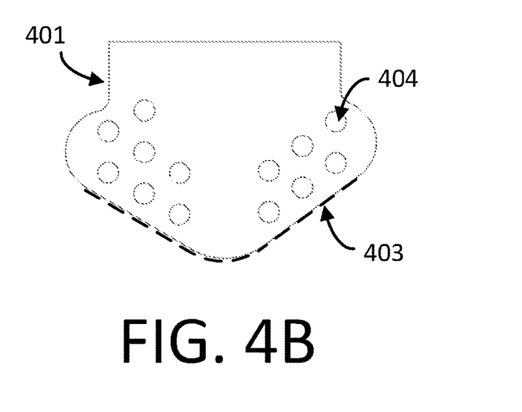

FIGS. 4A and 4B show an embodiment 400 of mechanical support 141 with hard and soft materials (402 and 401, respectively). Soft material 401 contains uniformly sized holes 404 to create variable stiffness at the sensor mounting surface 403.

While embodiments 200, 300, 310 and 400 were designed for use in a fillet of a test object, other embodiments address different test object geometries such as fir trees, disk slots, weld crown, girth welds, dovetails, and the like.

Figure 5:
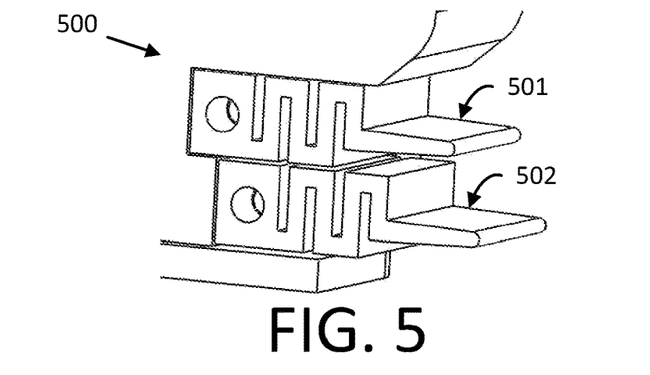
FIG. 5 is a mechanical support according to some embodiments.

FIG. 5 shows an embodiment 500 of mechanical support 121 that includes multiple "fingers" that have variable stiffness in multiple directions. Two fingers, 501 and 502, are shown, but any suitable number may be present. Mechanical support 500 may be used to push sensor 120 into small fillets in an engine blade fir tree. (For simplicity sensor 120 is not shown; the sensor could be secured at the tip of fingers 501 and 502.) Specifically fingers 501 and 502 provide high pressure to sensor 120 into the fillets of the fir tree. Sensor 120 may be unsupported between the fingers where liftoff is less critical.

Figure 6:
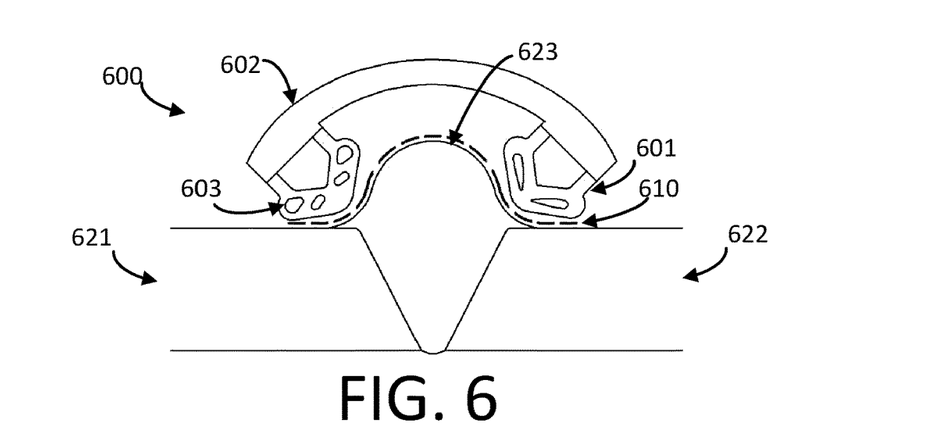
FIG. 6 is a cross-sectional view of a sensor cartridge and a welded joint according to some embodiments.

FIG. 6 shows a sensor cartridge 600 for inspecting test object joining piece 621 with piece 622 using weld 623. Weld 623 has concave regions on the left and right side of the weld crown. Sensor cartridge 600 includes a mechanical support made of component 601, component 602, and sensor array 610. Note that component 601 may be mirrored and duplicated to inspect the second concave region of the weld simultaneously with the first. The mechanical support may include features such as captured volumes 603 in component 601. In this example sensor cartridge may be scanned along the weld (into our out of the page).

Figure 7:
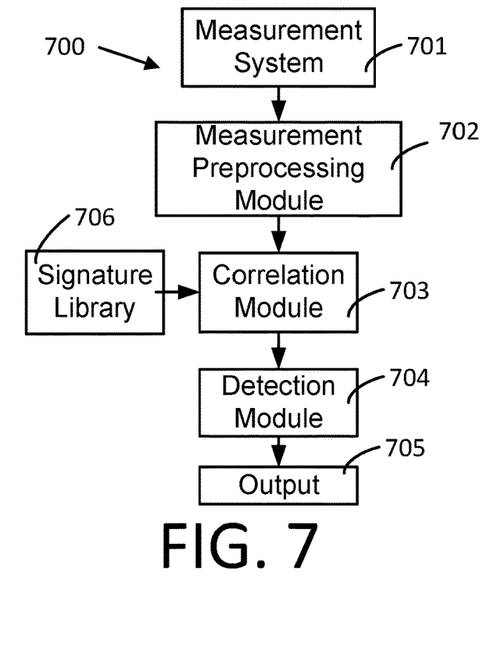
FIG. 7 is a flow diagram for processing sensor measurements according to some embodiments.

Turning to FIG. 7 a flow diagram 700 for processing sensor measurements is shown. Such flow may be used, for example, to better identify defects detected by a sensor array, though the flow could also be used to process data from a single channel sensor operated in, for example, a raster scan mode. At a high level the processing implemented by flow diagram 700 corrects for variation in the sensor response signal due to the relative position of the sensing elements of the array (or raster path of a sensor) and a defect. It may also assist in correcting for variation in liftoff.

Flow diagram 700 may be implemented, for example, as a method or as a system. In one embodiment, system 100 (FIG. 1) is used with box 701 implemented by impedance analyzer 117, sensor 120, and various related components of system 100; boxes 702, 703, and 704 implemented as part of modules 109; box 705 implemented as part of user interface 113; and signature library 706 stored in memory 115 of system 100. However, it should be appreciated that flow diagram 700 may be implemented in any suitable way.

Flow diagram 700 is now described in detail with reference to an eddy current array sensor. Those of skill in the art will appreciate that the processing can also be applied to data collected by a rastered sensor, dielectrometry sensors and sensor arrays, and other suitable sensors.

The processing utilizes a signature library 706 containing signatures that are correlated with measurements from sensor 120 to enhance detection of defects having the characteristic shapes provided in signature library 706. In some embodiments signature library 706 contains multi-channel responses of an array sensor to a defect of interest. The defect of interest may be a defect of known properties on an available test object 130. For example, the defect of interest may be a crack of a certain length and depth.

The signatures in signature library 706 may be generated using actual sensor measurements from a defect, from analytical or numerical methods simulating a defect response, or in any suitable way. For example, signatures can be generated using measurements from sensor 120 on a specimen having a defect of interest. In this example embodiment sensor 120 is a sensor array scanned over the defect of interest and the response is recorded on multiple channels. After scanning the defect the position of the sensor transverse to the scan direction is incremented and the scan is repeated. The transverse increment may be smaller than the channel spacing so that the response of the sensor array to the defect at different transverse positions can be captured. Motion control equipment may be used to control the relative position of the sensor and defect specimen. As in this example, the test object with the defect used for producing signatures may have a simplified geometry as compared to the test object(s) that will be measured for the application and actual inspection.

In addition to creating signatures for different transverse positions, signatures may be included in the library for multiple nominal liftoffs. This can be achieved, for example by inserting a shim between the sensor and the test object.

Signature measurements may also be collected at multiple frequencies

Figure 8A:
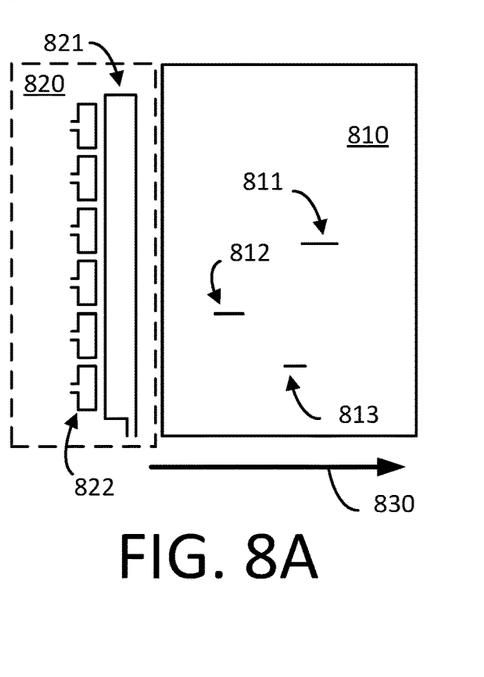
FIG. 8A is a measurement setup used for measuring defect signatures according to some embodiments.

FIG. 8A illustrates how a linear array eddy current sensor 820 may be used with a test object 810 having a defect 811 (a crack) to capture sensor responses for signature library 706. Data was collected as described in connection with FIG. 8A where sensor 820 was an FA235 MWM-Array eddy current sensor available from JENTEK Sensors, Inc. Sensor 820 includes a linear drive winding 821 and an array of sense elements 822. The FA235 has a sense element spacing of 1 mm (0.040 inches). Signatures were captured from crack 811 by scanning sensor 820 in direction 830. The process was repeated at 11 transverse increments of 0.1 mm (0.004 inches) each. The resulting measurement data is shown as B-scans 1 through 11 in FIG. 8B. For each scan in FIG. 8B the horizontal axis is the position on in the scan direction (which was recorded using a position encoder) and the vertical axis is the estimated electrical conductivity value ("σ") on each channel of the sensor array. For simplicity numerical values are not shown, however both scales are noted to be linear. The scan covered the entire width of test object 810 and the FA235 sensor array also passed over cracks 812 and 813 as part of this scan. The raw impedance measurements were processed to estimate the conductivity on each channel using a planar magnetoquasistatic (MQS) model and multivariate inverse methods. The three cracks result in visible perturbations in the conductivity estimate. The right most perturbation relates to crack 811 for which the signature library is desired in this example.

Figure 8B:
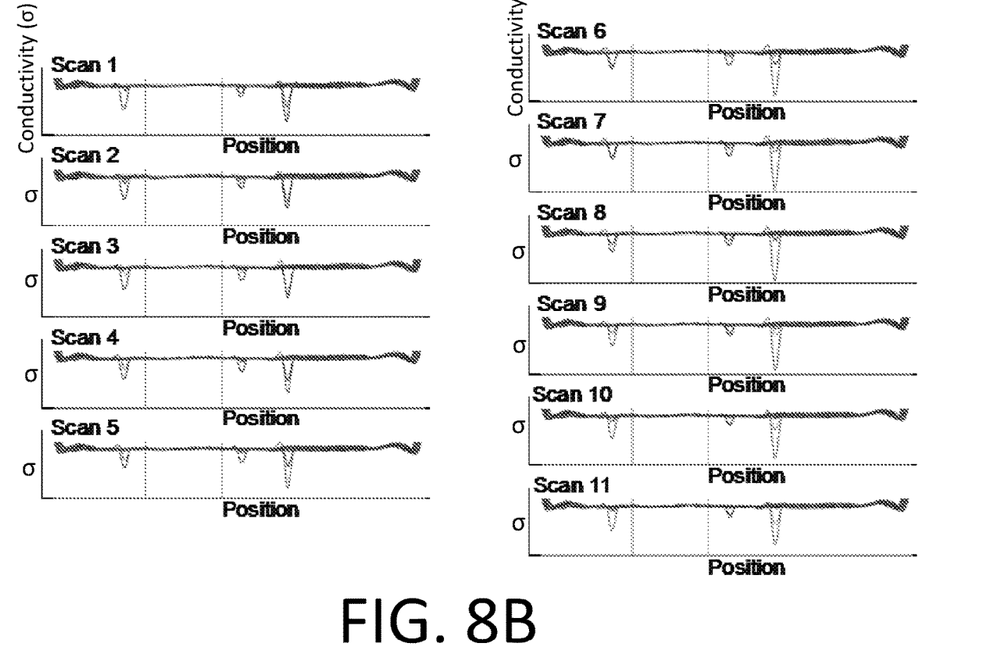
FIG. 8B are measurement results at each of 11 incremental transverse positions obtained from the measurement setup illustrated in FIG. 8A.

In this example, a 2-channel signature is desired. That is each signature in the signature library will store the defect response from 2 sense elements in the array. The number of channels for the signature is chosen based on the number of sense elements for which the measurements are perturbed by the defect in a typical scan. This is dependent upon the size of the defect and the orientations of the defect and the sensor array relative to the scan direction. In this example embodiment, a 2-channel signature was chosen because in the desired scanning configuration the response from crack 811 extended across two adjacent channels.

Figure 8C:
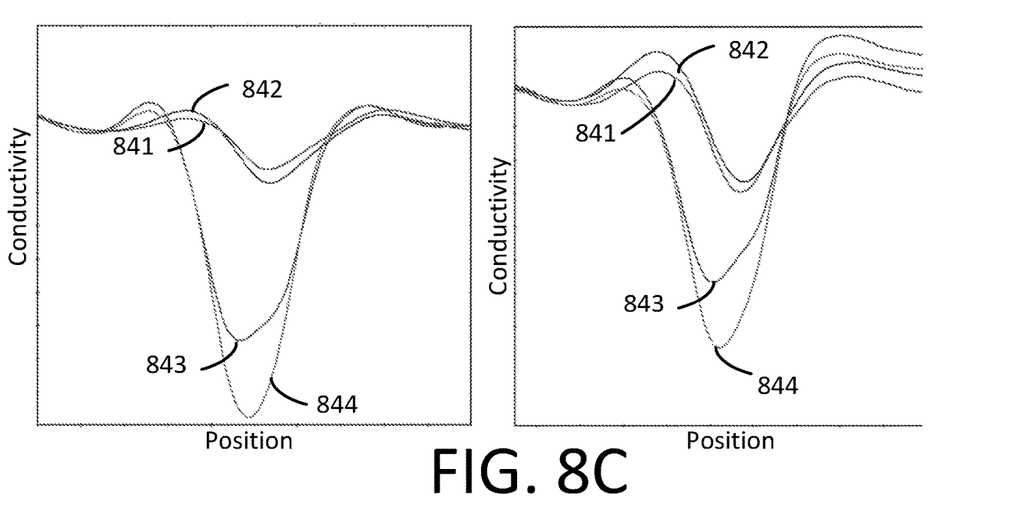
FIG. 8C are 2-channel defect signatures at two frequencies obtained from the measurement setup illustrated in FIG. 8A.

FIG. 8C shows detailed B-scans of crack 811 for two different transverse scans. Curves 843 and 844 are for the same sense element taken at 5 MHz and 10 MHz, respectively; curves 842 and 841 are for an adjacent sense element at 5 MHz and 10 MHz, respectively. Notably for the left plot the defect response is dominantly on one channel while in the right plot, for a different transverse scan, the defect response is substantial on both channels.

It is noted that the relative position of the channels for the signatures is important but the side to side order may not be. That is a two channel crack signature consisting of channel A and channel B may be used to process two channel data with channel A of the signature correlating with channel 0 of the measurement data and channel B with channel 1 of the measurement data, or with channel A of the signature correlating with channel 1 of the measurement data and channel B with channel 0 of the measurement data. Though in some embodiments there may be asymmetries that reduce the utility of simply switching the order of signature channels. For the purposes of the mathematical notation below channel order is fixed and each is considered a unique signature. Those of skill in the art will readily appreciate that this is done without loss of generality.

Once the measurements for each signature is captured the measurement data may be modified for use in signature library 706. Steps to prepare the signature may include, for example, cropping the measurement data away from the signature, digitally resampling the signature to achieve a desired spacing of the samples, and subtracting the mean value from each datapoint. Though, any suitable preprocessing of the signature for library 706 may be performed. Signature libraries may be prepared for multiple frequencies, different numbers of channels (e.g., 1, 2, 3 . . . ), different sensor orientations, different defects, different liftoffs, and other such parameters that may be desired for a particular application. In the example of FIGS. 8A and 8B, signatures could also be generated for cracks 812 and 813.

Returning now to flow diagram 700 in FIG. 7, attention is drawn to boxes 701 through 705 which represent the process steps and/or modules used to process sensor data using signature library 706 for defect detection. Initially at box 701 a measurement system is used to collect sensor measurements. Measurement system may collect measurements in ways similar to those described in connection with system 100 and FIG. 1. Once measurement data is collected the data may be preprocessed at box 702. The preprocessing may digitally resample the measurement data so that it has the same measurement spacing as the signatures in signature library 706. In some embodiments the preprocessing module subtracts the mean value of each measurement set to be correlated with the signatures of the signature library.

Define N as the integer number of samples in a signature on one channel; define Q as the integer number of channels in the signature; and P as the integer number of signatures in the signature library. Define L as the measurement spacing (unit length). This implies the physical length of the signature is N×L. Let $s_{p,q,i}$ be the value of the pth signature (p from 0 to P−1) in the signature library on the qth channel (q from 0 to Q−1) at the ith index location (i from 0 to N−1). Further, define M (M≥N) as (post resampling for spacing) the integer number of samples per channel in the measurement data to be analyzed and define K as the integer number of measurement channels. Let $m_{k,j}$ be the measurement value of the kth channel (k from 0 to K−1) at the jth index location (j from 0 to M−1). This allows for a total of P×(M−N+1)×(K−Q+1) correlations to be performed.

At box 703 a correlation module determines a correlation value for each measurement set. The correlation may be similar or identical to a cross-correlation of the measurement with the defect signature. The correlation may be calculated in any suitable way. In the simple example where Q=1 the correlation may be calculated as shown in Formula 1.

$$s_{p,0} \cdot m_{k,j} / (s_{p,0})^2 \tag{1}$$

where "·" is the dot product, $s_{p,0} = [s_{p,0,0}, \ldots, s_{p,0,N-1}]$ and $m_{k,j} = [m_{k,j}, \ldots, m_{k,j+N-1}]$, for j from 0 to M−N, k from 0 to K−1, and p from 0 to P−1. In some embodiments each measurement set, $m_{k,j}$, may be preprocessed to remove the mean value of the set from each sample in the set. Notably if $s_{p,0} = m_{k,j}$ the result is 1. The produces P correlation values for each measurement set $m_{k,p}$. In some embodiments only the largest correlation value for each measurement set is of interest and used in subsequent processing steps; though the correlation values may be stored and processed in any suitable way. It should be appreciated that this correlation function is illustrative and other correlation functions may be used.

When the number of channels, Q, in each signature is greater than one the correlation may be calculated as shown in Formula 2.

$$\sum_{q=0}^{Q-1} (s_{p,q} \cdot m_{k+q,j}) \Big/ \sum_{q=0}^{Q-1} (s_{p,q})^2 \tag{2}$$

where j from 0 to M−N, k from 0 to K−Q, and p from 0 to P−1. In some embodiments the preprocessing step of removing the mean is performed channel-by-channel for both the signature and the measurement set. If $s_{p,q} = m_{k+q,j}$ for all q=0 to Q−1 the result is 1.

Figure 8D:
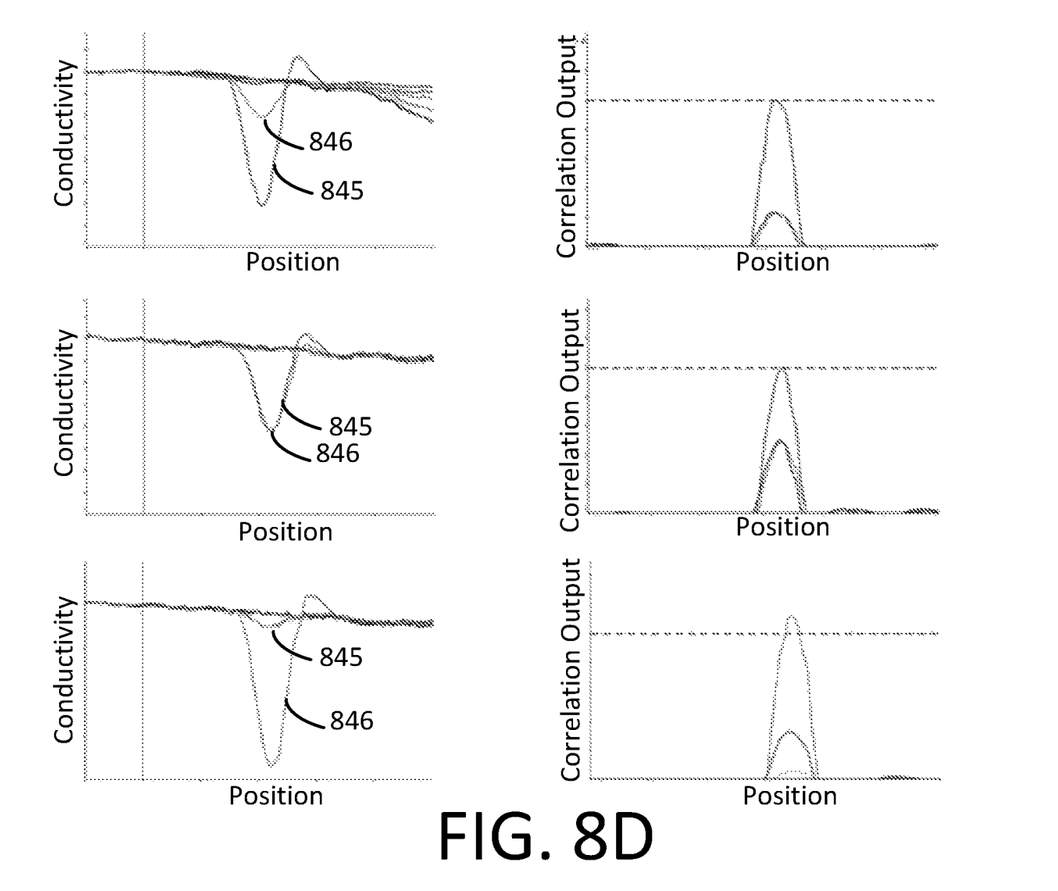
FIG. 8D are correlation results obtained using a signature library generated from data taken in the setup shown in FIG. 8A.

FIG. 8D at left shows B-scan measurement data at three different transverse positions over a defect. In the top plot the crack response is predominantly on channel 845 and slightly on channel 846; in the middle plot the crack response is approximately equal on both channels 845 and 846; and in the bottom plot the crack response is predominantly on channel 846 and slightly on channel 845. At right are the corresponding results of the correlation step using a 2-channel crack signature library generated from the data presented in FIG. 8B. The correlation is calculated for each adjacent set of channels. The results show that the correlation function produces nearly identical peak values for all three transverse positions of the scans of the crack. (The dashed line is shown for reference.)

Note that each plot on the right in FIG. 8D shows multiple lines. Each line corresponds to a different set of adjacent sense elements. For example, assume sense elements are labelled left to right as A, B, and C. One line may be for the correlation determined from measurements on sense elements A and B with the signature library, and a second line for the correlation determined from sense elements B and C with the signature library. (The correlation for measurements from sense elements A and C with the signature library is not determined in this example because they are not adjacent to one another.)

In some embodiments a detection module at box 704 is used to flag defects. In some embodiments the detection module uses a simple threshold of the correlation value to flag the presence of a defect. In some embodiments multiple thresholds are used with each incremental threshold indicating a defect of a greater severity. It should be appreciated that other detection criteria may be used to provide a robust defect detection system.

Finally at box 705 the results are output in a suitable way. The results may be output, for example, to a user interface device such as a display or recorded to a memory. In some embodiments the results are output as B-scan or C-scan images.

Having thus described several aspects of at least one embodiment of this invention, it is to be appreciated that various alterations, modifications, and improvements will readily occur to those skilled in the art.

Such alterations, modifications, and improvements are intended to be part of this disclosure, and are intended to be within the spirit and scope of the invention. Accordingly, the foregoing description and drawings are by way of example only.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers.

Further, it should be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smartphone or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, the invention may be embodied as a computer readable medium (or multiple computer readable media) (e.g., a computer memory, one or more floppy discs, compact discs, optical discs, magnetic tapes, flash memories, circuit configurations in Field Programmable Gate Arrays or other semiconductor devices, or other tangible computer storage medium) encoded with one or more programs that, when executed on one or more computers or other processors, perform methods that implement the various embodiments of the invention discussed above. The computer readable medium or media can be transportable, such that the program or programs stored thereon can be loaded onto one or more different computers or other processors to implement various aspects of the present invention as discussed above.

In this respect, it should be appreciated that one implementation of the above-described embodiments comprises at least one computer-readable medium encoded with a computer program (e.g., a plurality of instructions), which, when executed on a processor, performs some or all of the above-discussed functions of these embodiments. As used herein, the term "computer-readable medium" encompasses only a computer-readable medium that can be considered to be a machine or a manufacture (i.e., article of manufacture). A computer-readable medium may be, for example, a tangible medium on which computer-readable information may be encoded or stored, a storage medium on which computer-readable information may be encoded or stored, and/or a non-transitory medium on which computer-readable information may be encoded or stored. Other non-exhaustive examples of computer-readable media include a computer memory (e.g., a ROM, a RAM, a flash memory, or other type of computer memory), a magnetic disc or tape, an optical disc, and/or other types of computer-readable media that can be considered to be a machine or a manufacture.

The terms "program" or "software" are used herein in a generic sense to refer to any type of computer code or set of computer-executable instructions that can be employed to program a computer or other processor to implement various aspects of the present invention as discussed above. Additionally, it should be appreciated that according to one aspect of this embodiment, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that conveys relationship between the fields. However, any suitable mechanism may be used to establish a relationship between information in fields of a data structure, including through the use of pointers, tags or other mechanisms that establish relationship between data elements.

Various aspects of the present invention may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Also, the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

For the purposes of describing and defining the present disclosure, it is noted that terms of degree (e.g., "substantially," "slightly," "about," "comparable," etc.) may be utilized herein to represent the inherent degree of uncertainty that may be attributed to any quantitative comparison, value, measurement, or other representation. Such terms of degree may also be utilized herein to represent the degree by which a quantitative representation may vary from a stated reference (e.g., about 10% or less) without resulting in a change in the basic function of the subject matter at issue. Unless otherwise stated herein, any numerical values appeared in this specification are deemed modified by a term of degree thereby reflecting their intrinsic uncertainty.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. A sensor cartridge comprising:
    a sensor; and
    a mechanical support having a first surface to which the sensor is secured and comprising
        a first component made with a first material, the first component having a plurality of holes substantially axially aligned in a first direction devoid of the first material for providing variable stiffness along the first surface; and
        a second component made of a second material, the second material having a greater stiffness than the first material, the second component abutting a second surface of the first component, the second surface having a normal that is substantially parallel to the first direction.

2. The sensor cartridge of claim 1, wherein each of the holes has a cross-sectional dimension between 1 mm and 5 mm.

3. The sensor cartridge of claim 1, wherein the holes include a first hole having a first cross-section and a second hole having a second cross-section, the first cross-section being different from the second cross-section.

4. The sensor cartridge of claim 1, wherein the holes have a common cross-section.

5. The sensor cartridge of claim 4, wherein the common cross-section is circular.

6. The sensor cartridge of claim 1, wherein the sensor is an eddy current sensor array and the first direction is between 35 and 55 degrees relative to a second direction of the array.

7. The sensor cartridge of claim 1, wherein the sensor is an eddy current sensor array and the first direction is substantially perpendicular to a second direction of the array.

8. The sensor cartridge of claim 1, wherein the plurality of holes are empty.

9. The sensor cartridge of claim 1, wherein the plurality of holes are substantially filled with a third material having a different stiffness than the first material.

10. The sensor cartridge of claim 1, wherein the first surface comprises a first flat region joined to a second flat region by a curved region, wherein an angle between the first flat region and second flat region is between 20 and 170 degrees.

11. The sensor cartridge of claim 10, wherein the stiffness along the first surface is greater in the curved region than in both the first flat region and the second flat region.

12. The sensor cartridge of claim 11, wherein the second component comprises a wedge-shape that points towards the curved region of the first surface.

13. A method of inspecting a test object, the method comprising acts of:
    pressing a sensor cartridge into a concave surface of the test object, the sensor cartridge comprising a sensor with a plurality of sensing elements and a mechanical support, the mechanical support having a first component abutting a second component along a second surface of the first component, the first component having the sensor attached to a first surface thereof, the second component having a wedge-shape facing the concave surface and a greater stiffness than the first component, wherein in a relaxed state the first component has a radius of curvature smaller than a radius of curvature of the concave surface, wherein the pressing elastically deforms the first component from the relaxed state to a compressed state where the mechanical support first component conforms to the concave surface; and
    collecting measurement data from the sensor cartridge while the mechanical support is in the compressed state.

14. The method of claim 13, further comprising:
scanning the sensor cartridge axially along the concave surface of the test object, wherein the collecting of measurement data repeats a plurality of times during the scanning.

15. The method of claim 13, wherein the first component comprises a plurality of holes axially aligned with an axis of the radius of curvature of the mechanical support.

16. The method of claim 13, wherein the surface of the first component to which the sensor is attached has a curved region flanked by side regions, and the pressing causes the sensor to contact the test object along the side regions before the sensor contacts the test object along the curved region.

17. The method of claim 16, wherein the concave surface of the test object is a fillet formed at the joint of a third surface and a fourth surface having an angle that varies axially along the fillet, and during the scanning the mechanical support maintains conformity with the concave surface of the test object.

18. A sensor cartridge comprising:
    a sensor array; and
    a mechanical support having
        a first component with a first surface to which the sensor array is secured, the first component made with a first material having at least first and second holes devoid of the first material whose size and location provide variable stiffness along the first surface, wherein axes of the first and second holes are substantially parallel to one another; and
        a second component made of a second material, the second material having a greater stiffness than the first material, the second component abutting a second surface of the first component, the second component comprising a wedge-shape that points towards a curved region of the first surface.

19. The sensor cartridge of claim 18, wherein the first surface comprises a first flat region joined to a second flat region by a curved region, wherein an amount of first material absent for holes adjacent to the first flat region is greater than that adjacent to the curved region.

* * * * *